United States Patent
Kolbenschlag

(10) Patent No.: US 8,528,583 B2
(45) Date of Patent: Sep. 10, 2013

(54) PNEUMATIC AMPLIFIER AND ARRANGEMENT FOR REGULATING A REGULATING ARMATURE OF A PROCESS PLANT

(75) Inventor: Stefan Kolbenschlag, Darmstadt (DE)

(73) Assignee: Samson Aktiengesellschaft, Frankfurt (DE)

( * ) Notice: Subject to any disclaimer, the term of this patent is extended or adjusted under 35 U.S.C. 154(b) by 1235 days.

(21) Appl. No.: 12/341,131

(22) Filed: Dec. 22, 2008

(65) Prior Publication Data

US 2009/0159135 A1    Jun. 25, 2009

(30) Foreign Application Priority Data

Dec. 21, 2007    (DE) .................... 10 2007 062 207

(51) Int. Cl.
*F15B 5/00* (2006.01)
*F15B 13/04* (2006.01)
*G05D 16/00* (2006.01)

(52) U.S. Cl.
USPC ....................................... 137/82; 137/596.18

(58) Field of Classification Search
USPC .................... 137/82, 596, 596.18, 102
See application file for complete search history.

(56) References Cited

U.S. PATENT DOCUMENTS

| | | | |
|---|---|---|---|
| 2,982,293 A | | 5/1961 | Dillon |
| 3,683,968 A | * | 8/1972 | Akeley .................... 137/625.66 |
| 3,762,444 A | | 10/1973 | Nagata et al. |
| 4,207,914 A | * | 6/1980 | Holloway et al. ................ 137/85 |
| 4,898,200 A | * | 2/1990 | Odajima et al. ................ 137/85 |
| 4,945,764 A | * | 8/1990 | Frederick ........................ 73/497 |
| 5,370,152 A | | 12/1994 | Carey et al. |
| 5,493,488 A | * | 2/1996 | Castle et al. .................... 700/42 |
| 5,934,169 A | | 8/1999 | Regel |
| 6,418,956 B1 | * | 7/2002 | Bloom ........................... 137/14 |
| 2008/0099069 A1 | | 5/2008 | Cook |

FOREIGN PATENT DOCUMENTS

| | | |
|---|---|---|
| DE | 19 17 079 C3 | 10/1969 |
| DE | 2116197 | 4/1971 |
| DE | 3741364 A1 | 6/1989 |
| DE | 42 40 802 C2 | 6/1994 |
| DE | 195 06 469 C1 | 4/1996 |
| EP | 0 503 894 B1 | 9/1995 |
| EP | 0 884 667 A1 | 12/1998 |
| GB | 1256384 | 12/1971 |
| GB | 2 064 168 A | 6/1981 |
| GB | 2064168 * | 6/1981 |

* cited by examiner

*Primary Examiner* — Len Tran
*Assistant Examiner* — Chee-Chong Lee
(74) *Attorney, Agent, or Firm* — Schiff Hardin LLP

(57) ABSTRACT

A pneumatic amplifier is provided comprising a supply air valve with a supply input connected to a pneumatic supply, a signal input for receiving a pneumatic input signal, a signal output for transmitting an amplified pneumatic output signal, a valve member for continuously opening or cutting off a pneumatic connection between the pneumatic supply and the signal output, and a diaphragm coupled with the valve member exposed at one side to the pneumatic input signal and having an opposite side. An exhaust air valve is provided with a bleed output, and a valve member for opening or cutting off a pneumatic connection between the signal output of the supply air valve and the bleed output. The valve members of the supply air valve and the exhaust air valve are structurally separated. The opposite side of the supply air valve diaphragm is exposed to the amplified pneumatic output signal.

5 Claims, 4 Drawing Sheets

PNEUMATIC AMPLIFIER AND ARRANGEMENT FOR REGULATING A REGULATING ARMATURE OF A PROCESS PLANT

BACKGROUND

The preferred embodiment relates to a pneumatic amplifier which generically is intended to comprise a supply air valve and an exhaust air valve. The supply air valve is connected with a pneumatic supply which supplies, for example, a supply pressure of 6 bar. Through a pneumatic connection, the pneumatic amplifier receives a pneumatic input control signal, which is generated, for example, by an electro-pneumatic converter. The electro-pneumatic converter can be, for example, a flapper nozzle arrangement or a modulated switching element, which is controlled pulse width modulated (PWM: "Pulse Width Modulation"). Typically, such electro-pneumatic converters are moved magnetically or by a piezo-electrical component.

The amplifier serves for increasing the air flows for venting and bleeding a volume. The amplifying degree depends on the supply pneumatics and the valve construction of the supply air valve or the exhaust air valve, respectively. As is known, because of its moveable valve member, the supply air valve can continuously open or cut off a pneumatic connection between signal input and signal output of the pneumatic amplifier. Furthermore, a diaphragm is coupled force- or form-locking to the valve member of the supply air valve. On its outside facing towards the signal input of the amplifier, the diaphragm is exposed to the input control signal pressure of the electro-pneumatic converter.

The exhaust air valve is provided with a bleed output for bleeding of the pneumatic amplifier. Typically, the exhaust valve has a valve member for continuously opening or cutting off a pneumatic connection between the signal output of the supply air valve or the volume, respectively, the pressure of which is to be controlled, and the bleed output.

For illustration of the functionality of a conventional pneumatic amplifier, reference is made to the attached FIGS. 1 and 2, which represent the schematic diagrams of the cross section of the amplifier in two states. FIG. 1 shows a venting or air-powering state of the known amplifier, and FIG. 2 shows the bleeding or exhausting state of the pneumatic amplifier.

The pneumatic power amplifier a has a pneumatic supply input b at which the supply pressure $P_v$ is applied. Furthermore, the pneumatic amplifier a has a bleed output c to which the atmospheric pressure $P_{atm}$ is applied. In addition, the pneumatic amplifier a has a control signal input d, through which the pneumatic input signal $P_S$ is received by an electro-pneumatic control unit (not shown). Finally, the pneumatic amplifier has a control signal output z.

A housing of the pneumatic amplifier a is divided into a supply chamber e, into which the supply input b runs, a working chamber f to which the control signal output z is allocated, a bleed chamber g with the bleed output c, and a control chamber h with the control signal input d. In a partition wall between the supply chamber e and the working area f, an opening i is formed which defines a valve seat for a first conical supply air valve member k. Between the working chamber f and the bleed chamber g, a first moveable diaphragm wall l is implemented which has a bleed or exhaust opening t which defines a valve seat for an exhaust air valve member n. The bleed chamber g is separated from the control chamber h by a second moveable diaphragm wall o, which is spring-biased. Between the control chamber h and the working chamber f, a bypass line q is provided, which can be continuously opened or closed by a throttle pin r. In this manner, the control behavior of the amplifier, in particular of the switching operation between bleeding and venting, can be optimized by setting a bypass flow $m_d$ from the control chamber h into the working chamber f.

During the venting process (FIG. 1), the pneumatic amplifier a, via the control signal input b, receives the pneumatic control signal $P_S$, by means of which the second diaphragm wall o is moved downwards against the pre-tension of the spring, wherein by means of a rigid coupling of the first diaphragm wall l to the second diaphragm wall o, the exhaust air valve member n is brought in contact with the valve seat to close the bleed opening t. Moreover, the supply air valve member k is moved downwards due to the structural coupling of the exhaust air valve member m with the supply air valve member k, whereby the valve seat of the opening i is released, and a supply flow passing through the opening i into the working chamber f is allowed. In this manner, a control flow $m_p$ towards a pneumatic actuator (not shown) can be released.

During bleeding or exhausting (FIG. 2) the pneumatic amplifier a, there is no control pressure $P_S$ in the control chamber h, whereby the spring-biased second diaphragm wall o is moved upwards, releasing the valve seat of the bleed or exhaust opening t, and, at the same time, the spring-biased supply air valve member k is moved towards the valve seat of the opening i. In this manner, a bleed flow $m_{enti}$ through the pneumatic amplifier a towards the bleed output c is possible.

The known pneumatic amplifier has the disadvantage that it requires a quite complex structure and hence high manufacturing cost for its production. It is particularly difficult to configure the switching function from venting to bleeding and vice versa by means of the dimensioning and design of the mechanical components. For this, it is important to generate a defined operation change upon switching the pneumatic amplifier, in particular by means of the adjusting pin.

Typically, the pneumatic amplifier is used for a pneumatic control system for controlling a control valve of a process plant, which is known, for example, from EP 0 884 667 A1. According to this, the pneumatic amplifier is comprised of two supply air and bleed valves connected in parallel, each of them connected with a pre-control unit, in particular with a electro-pneumatic converter.

The bleed unit is designed for a "negative" amplification, that is, for bleeding, and the supply air valve for "positively" amplifying the pneumatic control signal. The bleed control signal or the amplified signal, respectively, is to be transmitted to a pneumatic actuator. This arrangement, in pairs of two independent pre-control units with a separate control and each with a downstream supply air/bleed valve, is complex and cost-intensive, wherein the high number of parts results in an unfavorable high failure probability of the system, which during operation has to meet high safety standards.

DE 42 40 802 C2 discloses an electro-pneumatic converter to which a pneumatic amplifier is connected which is comprised of a supply air valve and an exhaust air valve. To both valves a pneumatic pre-control signal is applied.

Each of the valves is comprised of a double-diaphragm arrangement with different tappets between the two diaphragms and from the second diaphragm to the valve. The active areas of both diaphragms are here considerably different in size so that the output pressure reacts as little as possible on the control diaphragm. A pressure building up between the diaphragms, just because of its influence during temperature changes, would act as a disturbance. According to the typical design, the chamber located between the diaphragms is bled to the atmosphere to avoid this disturbance. The mechanical construction of this amplifier arrangement, however, is very complex, and the assembly is difficult and therefore overall expensive.

SUMMARY

It is an object to overcome the disadvantages of the prior art and in particular to improve a pneumatic amplifier such that with the assurance of a simple structural design, a defined switching function between venting and bleeding of the pneumatic amplifier is ensured.

A pneumatic amplifier is provided comprising a supply air valve with a supply input connected to a pneumatic supply, a signal input for receiving a pneumatic input signal, a signal output for transmitting an amplified pneumatic output signal, a valve member for continuously opening or cutting off a pneumatic connection between the pneumatic supply and the signal output, and a diaphragm coupled with the valve member exposed at one side to the pneumatic input signal and having an opposite side. An exhaust air valve is provided with a bleed output, and a valve member for opening or cutting off a pneumatic connection between the signal output of the supply air valve and the bleed output. The valve members of the supply air valve and the exhaust air valve are structurally separated. The opposite side of the supply air valve diaphragm facing away from the signal input is exposed to the amplified pneumatic output signal.

DESCRIPTION OF THE PREFERRED EMBODIMENTS

Figure 1:
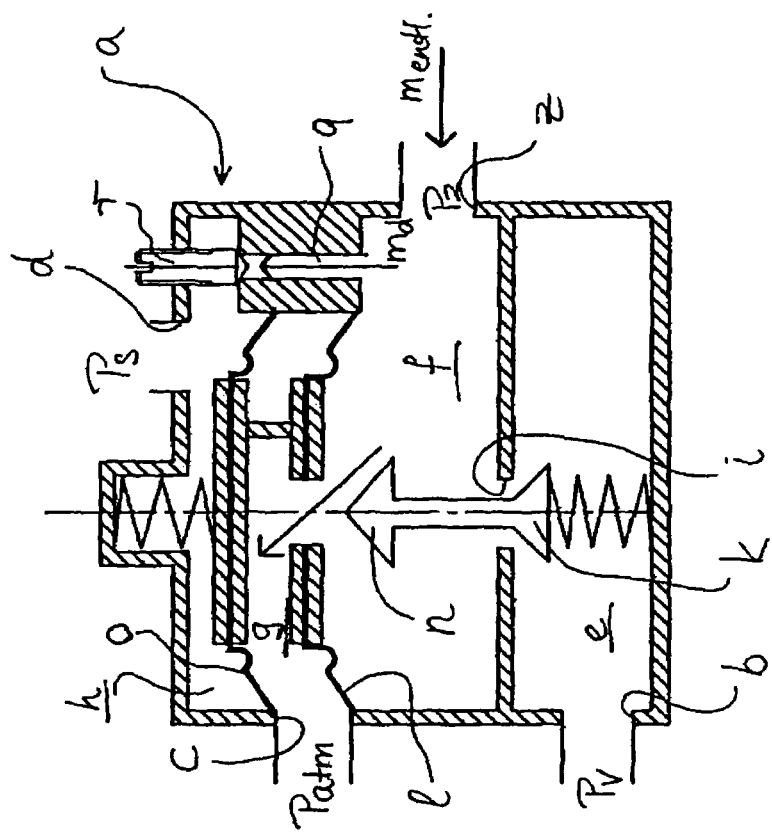
FIG. 1 shows a schematic illustration of a prior art pneumatic amplifier with a valve thereof closed.
Figure 2:
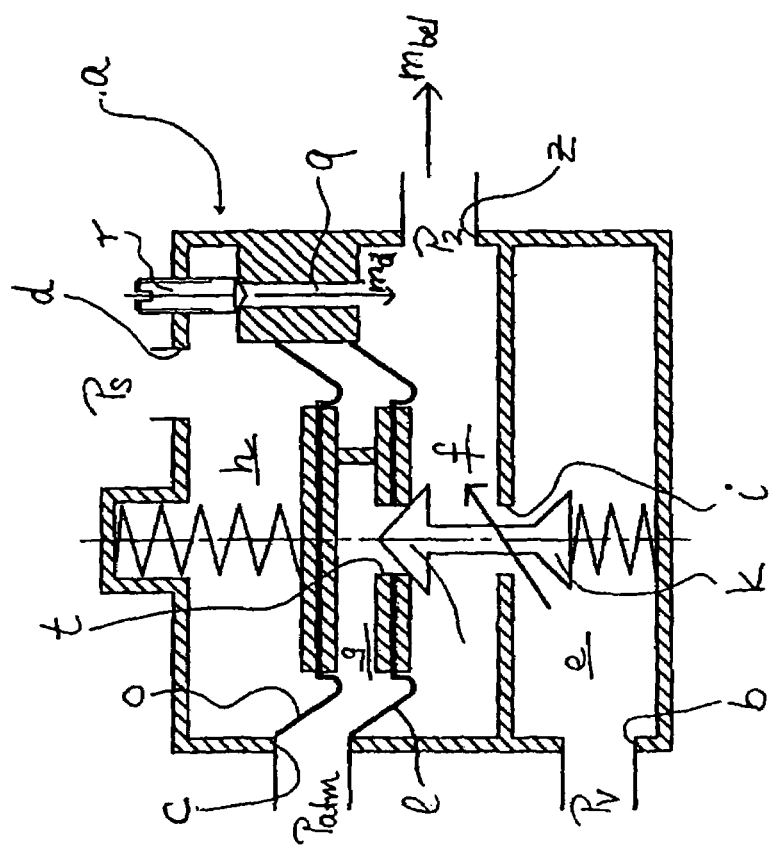
FIG. 2 shows the pneumatic amplifier of FIG. 1 but with the valve open.

For the purposes of promoting an understanding of the principles of the invention, reference will now be made to the preferred embodiments/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

In a preferred embodiment, the pneumatic amplifier comprises a supply air valve with a supply input connectable to the pneumatic supply, a signal input for receiving the pneumatic input signal, a signal output for transmitting an amplified pneumatic output signal, and a valve member, in particular for continuously opening and/or cutting off the pneumatic connection between the pneumatic supply and the signal output. Also a diaphragm is provided which is coupled with the valve member, and which defines an outside exposed to a pneumatic input signal and an outside facing away from the signal input. An exhaust air valve is provided with a bleed outlet for bleeding the pneumatic amplifier. A valve member is provided for continuously opening and/or cutting off a pneumatic connection between the signal output of the supply air valve and the bleed output. The valve members of the supply air valve and the exhaust air valve are structurally separated from one another. The supply air valve's diaphragm outside facing away from the signal input is exposed to the pneumatic output signal.

With the modification of the typical supply air valve design, according to which the diaphragm side facing the pneumatic output is exposed to atmospheric pressure, that is, to expose the outside facing the pneumatic output of the amplifier with the amplified output signal, it was surprisingly found that a clearly defined switching function could be provided without arranging for appropriate adjustment devices in the pneumatic amplifier.

In tests, it was surprisingly found that the pneumatic feedback effect of the amplified pneumatic output signal, thus the pneumatic amplifier's output pressure acting on the diaphragm, does not represent a disturbance for the amplification process, but in fact facilitates that the pneumatic amplifier is given a self-control effect without requiring an additional auxiliary electrical energy. It was found that the amplifier can be used up to the maximum value of the pre-control signal and hence can utilize almost the full pneumatic supply pressure. Because of the simple construction which is based on the technique of the preferred embodiment, a simple and quick assembly of the pneumatic amplifier is possible without having to install complex adjustment and calibration constructions.

In the preferred embodiment, the signal output of the supply air valve is pneumatically connected with the diaphragm outside facing away from the signal input.

Preferably, the exhaust air valve has an input pneumatically connected with the signal output of the supply air valve for receiving the amplified output signal.

In a further development of the preferred embodiment, the exhaust air valve has an input for receiving the pneumatic input signal. For this, the exhaust air valve's input, at which the amplified pneumatic output signal is applied, and the bleed outlet of the exhaust air valve can be pneumatically separated by means of a diaphragm from an exhaust air valve input for receiving the pneumatic input signal.

Preferably, the exhaust air valve has a valve member, in particular for continuously opening and/or cut off of a pneumatic connection between its input, at which the amplified pneumatic output signal from the supply air valve is applied, and its bleed output. Preferably, the bleed output is connected with the atmosphere or is at 0 bar.

In a preferred embodiment of the invention, the supply air valve and the exhaust air valve are implemented in one structural unit, whereby the assembly is simplified. Here, the respective valve members can be actuated independent from one another and are supported independent from one another. For this, the amplifier can comprise an integral housing which provides a feedback line between the inner output of the supply air valve and the inner input of the exhaust air valve for transmitting the amplified pneumatic output signal from the supply air valve.

Preferably, the amplified pneumatic output signal is transmitted to a pneumatic actuator, in particular for regulating a control valve of a process plant.

Furthermore, the preferred embodiment relates to an arrangement for regulating a regulating armature, such as a control valve, of a process plant. The arrangement comprises a device for generating a pneumatic control signal, such as an electro-pneumatic converter, a pneumatic actuator which is coupled with the regulating armature in an operational manner, and a pneumatic amplifier as described above which receives the control signal of a pneumatic input signal and which serves for transmitting the amplified pneumatic output signal to the actuator.

Preferably, the device is connected with a positioner.

Figure 3:
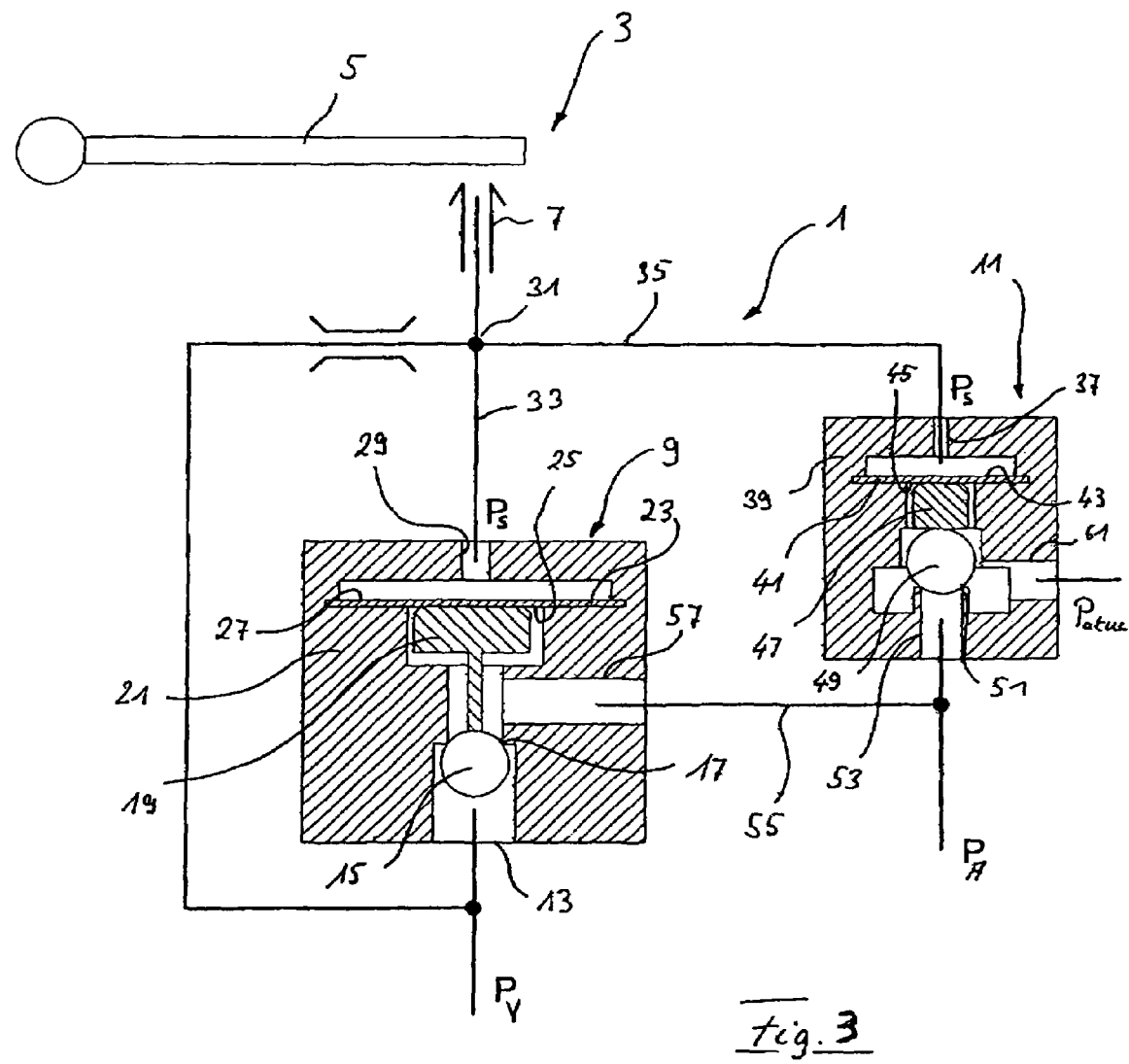
FIG. 3 shows a schematic illustration in which separate valves of an embodiment according to the invention of a pneumatic amplifier are illustrated in a cross-sectional view.

In FIG. 3, an embodiment of a pneumatic amplifier is shown and is in general indicated by the reference number 1. Upstream of the pneumatic amplifier 1, a pre-control unit 3 is arranged, which is implemented in the embodiment shown in FIG. 3 in the form of a flapper nozzle arrangement. By positioning the baffle plate 5 relative to the nozzle 7, a control pressure of pneumatic pre-control signal $P_S$ can be set which is delivered to the pneumatic amplifier 1. The pneumatic amplifier 1 comprised of a supply air valve 9 and an exhaust air valve 11, wherein the supply air valve 9 and the exhaust air valve 11 in the embodiment illustrated in FIG. 3 are formed by units which are structurally separated from one another and which are connected to one another in an operational manner via pneumatic lines which interconnect the respective valve housings.

The pneumatic amplifier 1 is connected to a pneumatic supply (not shown), which supplies a supply pressure of supply pneumatic $P_V$ of about 6 bar to the supply air valve 9 through this supply input 13. Downstream of the supply input 13, a supply air valve member 15 is arranged which is allocated to a downstream valve seat 17.

The supply air valve member 15 is coupled by means of a T-shaped tappet 19 to a diaphragm 23 mounted in the housing 21 of the supply air valve 9. The diaphragm 23 has an outside 25, which is facing away from the tappet 19 and which is covered by the tappet 19 to the largest extent, and is exposed within a narrow ring area. The diaphragm 23 outside 27, which is facing away from the tappet 19, is completely exposed so that the control pressure additionally seals the diaphragm 23 against the housing.

The outside 27 of the diaphragm 23 is allocated to the supply air valve's pneumatic signal input 29 which receives the pneumatic pre-control signal $P_S$ of the pre-control unit 3 so that the pre-control signal pressure of pneumatic pre-control signal $P_S$ is applied at the free outside 27 of the diaphragm 23.

At a switch 31, the pneumatic pre-control signal $P_S$ is conveyed in two lines 33, 35. Through the line 35, the pneumatic pre-control signal $P_S$ gets into a signal input 37 of the exhaust air valve 11. In the exhaust air valve 11 housing 39 which is structurally separated from the housing 21 of the supply air valve 9, a diaphragm 41 is arranged as well. The diaphragm 41 outside 43, which is allocated to the signal input 37, is exposed to the pneumatic pre-control signal $P_S$. The diaphragm 41 has an outside 45, which is facing away from the signal input 37 and to which a rod-shaped tappet 47 is attached, which is in active connection with an exhaust air valve member 49.

The outside 45 facing away from the signal input 37 is covered to the largest extent by the tappet and is exposed only in a narrow ring area. The free outside 43, which is facing towards the signal input 37, is considerably larger than the diaphragm 41 outside 45 which is facing away from the signal input 37.

The exhaust air valve member 49 is allocated to a valve seat 51. A control input 53 of the exhaust air valve 11 is connected through a connection line 55 with the supply air valve 9 signal output 57, through which the supply air valve 9 can deliver the pneumatic pre-control signal $P_S$ amplified by means of the supply pneumatics $P_V$ to, for example, a pneumatic actuator (not shown). The amplified pneumatic output signal is indicated by $P_A$. The exhaust air valve member 49 can continuously open and/or cut off a connection between the control input 53 and a bleed output 61, which is exposed to atmospheric pressure $P_{atm}$.

As can be seen in FIG. 3, there is a direct pneumatic connection between the signal output 57 of the supply air valve 9 and the diaphragm 23 outside 25 facing towards the tappet. The active areas can be adapted to the desired adjusting forces for moving the valve control elements by means of the dimensioning of the diaphragm size or the free cross section, respectively, and of the tappet.

In FIG. 1, an operation situation is illustrated in which the pressure of the pneumatic pre-control signal $P_S$ is substantially zero. If now the pressure of the pneumatic pre-control signal $P_S$ increases, the supply air valve member 15 releases the valve seat 17 so that a supply flow can flow past the valve seat 17 towards the signal output 57 and hence towards the pneumatic drive which is not shown here. Due to the pneumatic connection to the diaphragm 23, the pressure of the pneumatic output signal $P_A$ acts also at the outside 25 of the diaphragm 23, where a balance of forces at the outsides 25, 27 of the diaphragm 23 can arise based on the different area ratios. In this manner, a stable self-controlling positioning of the supply air valve member 15 is possible. The preferred embodiment overcomes the prejudice that the regulating diaphragm outside facing away from the pre-control pressure has always to be exposed to atmospheric pressure. It was found that a spherical supply air valve member is particularly suitable.

If the amplified pneumatic output signal $P_A$ increases too much, for example in the case of a leakage of the supply air valve member 15 at the valve seat 17, the exhaust valve 11 opens-up by pushing the exhaust air valve member 49 away from the valve seat 51 due to the strong pneumatic output signal $P_A$, and that against the pressure of the pneumatic pre-control signal $P_S$ acting at the diaphragm 41. By opening the exhaust air valve 49, the overpressure is relieved via the bleed output 61.

The exhaust air valve 11 can be designed as a pressure relief valve with a control characteristic or simply as an OPEN/CLOSED-valve. The exhaust air valve 11 has a characteristic curve which is defined, among other things, by the free areas of the outsides 43, 45 of the diaphragm 41, whereby upon exceeding of a certain pressure difference between pneumatic output signal $P_A$ and pneumatic pre-control signal $P_S$, the pneumatic amplifier 1 is bled.

By means of a thorough dimensioning of the free active areas of the diaphragm, and the arrangement of valve seat and valve member of the supply air and exhaust air valves 9, 11, a stable self-controlling pneumatic amplification system can be realized.

Figure 4:
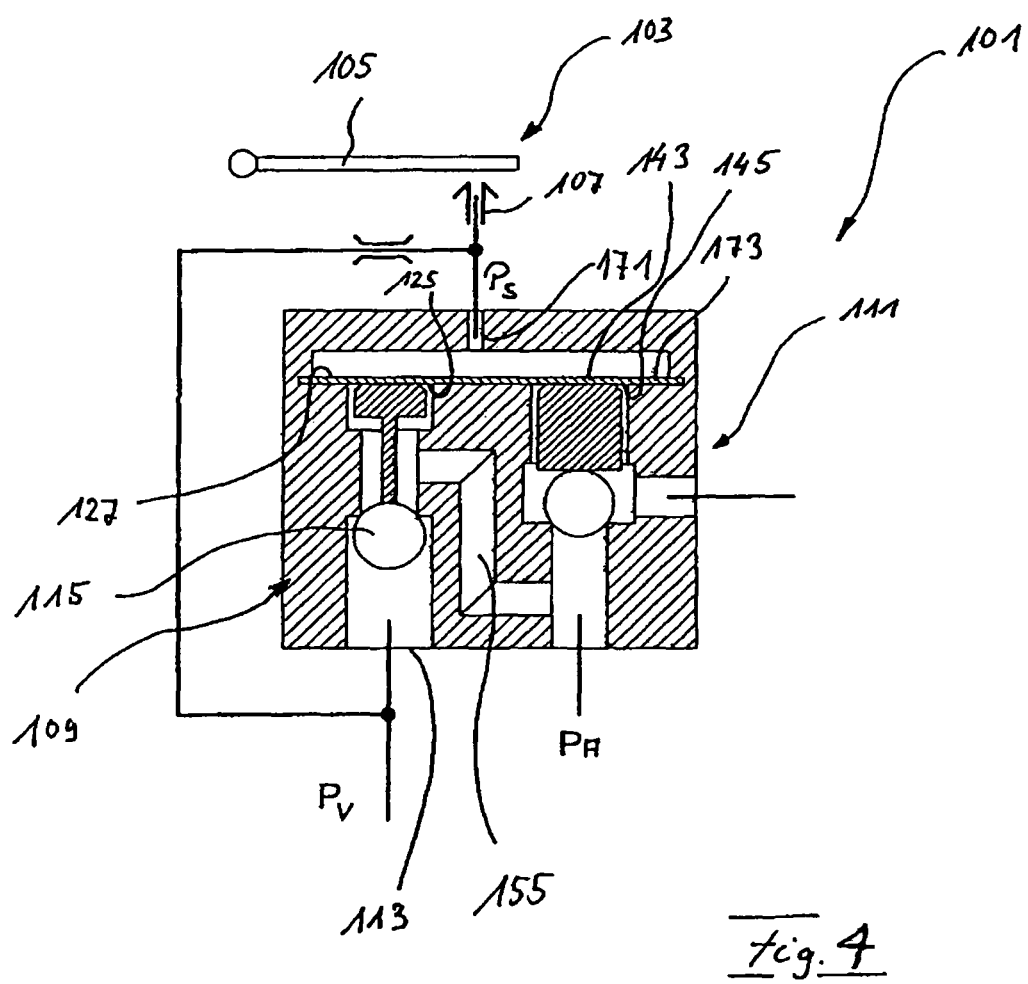
FIG. 4 shows a schematic illustration in which the pneumatic amplifier implemented in one structural unit is illustrated in a further preferred embodiment in a cross section.

In FIG. 4, a further embodiment of a pneumatic amplifier is illustrated, wherein for better readability of the description of the Figures for the same and/or identical components as in FIG. 3, the same reference numbers are used, increased by 100.

The pneumatic pre-control signal $P_S$ is applied for the exhaust air valve 11 and the supply air valve 109 over a common input 171 which is formed into a housing. The exhaust air valve 11 and the supply air valve 109 are formed by a common structural unit with a common housing and share a common diaphragm structure 173. The common diaphragm structure 173 is designed in a manner that the respective diaphragm structure for the supply air valve 109 does not influence the diaphragm function for the exhaust air valve 111. The tappet structure of both valves according to the embodiment of FIG. 4 is very similar to the embodiment according to FIG. 3, for which reason a further description is not necessary.

The connection line 155 in the embodiment according to FIG. 4 is limited by the common construction of the housing of the pneumatic amplifier 101.

The functionality of the pneumatic amplifier according to FIG. 4 corresponds to the one of FIG. 3.

Figure 5:
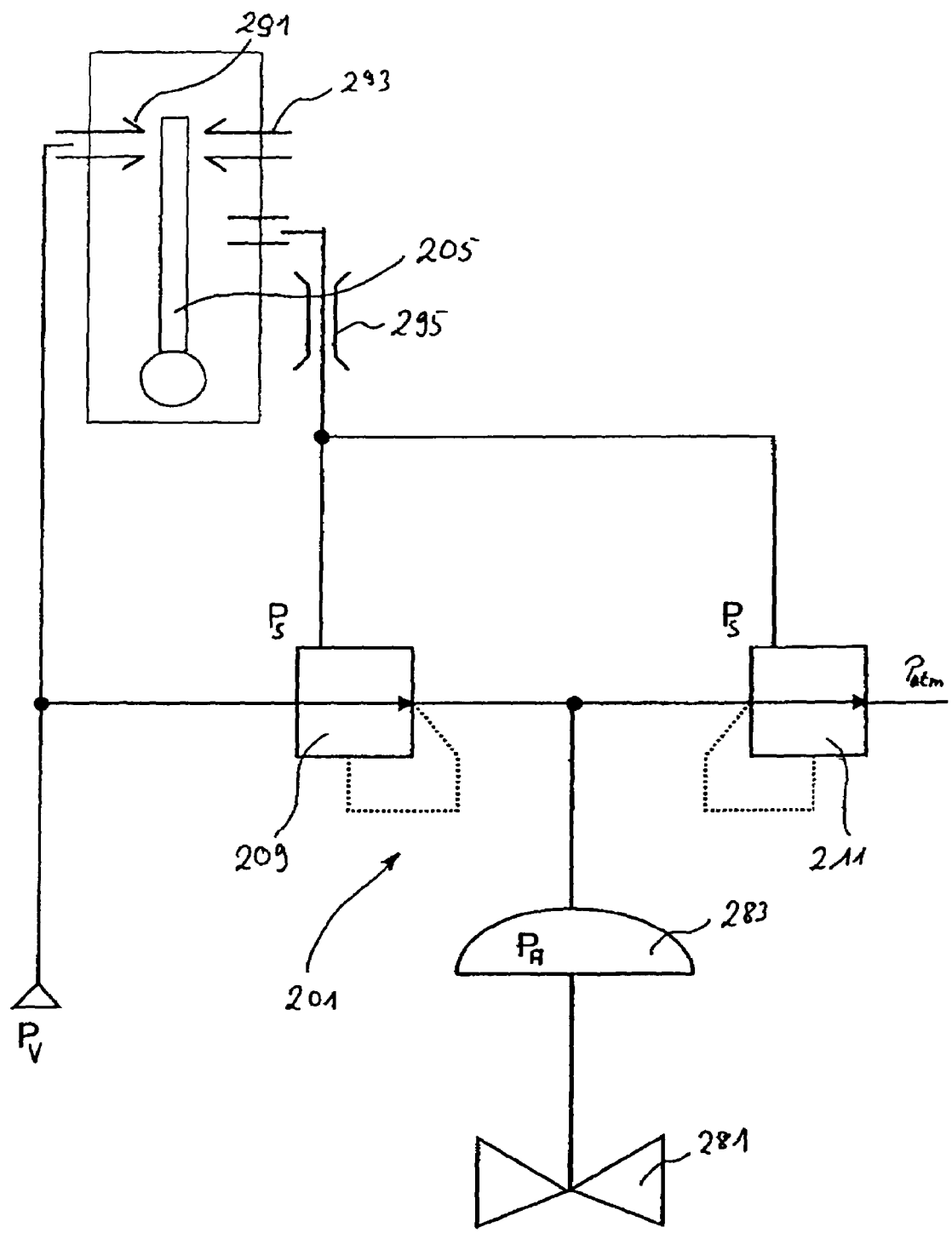
FIG. 5 shows a schematic sketch of an arrangement according to the invention for regulating a regulating armature.

In FIG. 5, a pneumatic amplifier according to the FIGS. 3 and 4 is schematically illustrated, wherein a different pre-stage is utilized. For a simple readability of the description of the Figures, for the identical and similar reference numbers with respect to the embodiments according to the FIGS. 3 and 24 the same reference numbers are used which are either increased by 100 or by 200.

FIG. 5 shows the overall design of an arrangement for regulating a regulating armature 281, which is regulated by a pneumatic actuator 283. The pneumatic actuator 283 receives an amplified pneumatic control signal $P_A$ from the pneumatic amplifier 201. The pneumatic amplifier 201 has the structure of an exhaust air valve 211 and of a supply air valve 209, as it is illustrated in the FIGS. 3 and 4.

The pre-stage for generating a pneumatic pre-control signal $P_S$, which is to be delivered to the pneumatic amplifier 201, has an encapsulated tilting element in the form of a pivotable baffle plate 205, which is allocated to two nozzles, that is, a supply pneumatics nozzle 291 and a bleed nozzle 293. For example, by means of a frequency control, a modulated pressure can be generated which is transformed via a throttle 295 to a stable pressure for the pneumatic control signal $P_S$, which is delivered to the volume before the pneumatic amplifier 201.

While preferred embodiments have been illustrated and described in detail in the drawings and foregoing description, the same are to be considered as illustrative and not restrictive in character, it being understood that only the preferred embodiments have been shown and described and that all changes and modifications that come within the spirit of the invention both now or in the future are desired to be protected.

I claim as my invention:

1. A pneumatic amplifier, comprising:

a supply air valve with a supply input connected to a pneumatic supply, a signal input for receiving a pneumatic input signal, a signal output for transmitting an amplified pneumatic output signal, a valve member for continuously opening or cutting off a pneumatic connection between the supply input and the signal output, and a diaphragm coupled with the valve member and which has one side exposed to the pneumatic input signal and an opposite side facing away from the signal input being exposed to the amplified pneumatic output signal;

an exhaust air valve having a control input, a bleed output for bleeding or exhausting the exhaust air valve, a valve member for continuously opening or cutting off a pneumatic connection between said control input and the bleed output, a signal input separate from the bleed output for receiving the same pneumatic input signal which is also applied at the signal input of the supply air valve, the control input being connected to the supply air valve signal output to receive the amplified pneumatic output signal, and the signal input being pneumatically separated at all times by a diaphragm from the control input and the bleed output;

the bleed output of the exhaust air valve being exposed to atmosphere or to approximately zero bar; and the respective valve members of the supply air valve and the exhaust air valve being structurally separated from one another.

2. The amplifier according to claim 1 wherein the signal output of the supply air valve is pneumatically connected with the opposite side of the diaphragm facing away from the signal input.

3. The amplifier according to claim 1 wherein the supply air valve and the exhaust air valve are implemented into one structural unit, wherein the respective valve members are supported independent from one another.

4. The amplifier according to claim 1 wherein an integral housing is provided for the supply air valve and the exhaust air valve, and which contains a feedback line between the signal output of the supply air valve and the control input of the exhaust air valve.

5. The amplifier according to claim 1 wherein the amplified pneumatic output signal is transmitted to a pneumatic drive for regulating a control valve.

* * * * *